(12) United States Patent
Shipman

(10) Patent No.: US 6,968,437 B2
(45) Date of Patent: Nov. 22, 2005

(54) READ PRIORITY CACHING SYSTEM AND METHOD

(75) Inventor: James R. Shipman, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 307 days.

(21) Appl. No.: 10/417,369

(22) Filed: Apr. 16, 2003

(65) Prior Publication Data

US 2004/0210732 A1   Oct. 21, 2004

(51) Int. Cl.[7] .......................................... G06F 12/00
(52) U.S. Cl. .................................. 711/167; 711/112
(58) Field of Search ...................... 711/111, 112, 113, 711/167; 360/78.01; 369/43, 47.38

(56) References Cited

U.S. PATENT DOCUMENTS

| | | | |
|---|---|---|---|
| 6,515,819 B1 * | 2/2003 | Schmidt et al. | 360/78.04 |
| 6,571,320 B1 * | 5/2003 | Hachmann | 711/141 |
| 6,681,289 B2 * | 1/2004 | Espeseth et al. | 711/112 |
| 6,804,751 B2 * | 10/2004 | Espeseth et al. | 711/158 |
| 6,865,642 B2 * | 3/2005 | Day et al. | 711/113 |
| 2004/0210732 A1 * | 10/2004 | Shipman | 711/167 |

OTHER PUBLICATIONS

Motlagh, et al., "Memory Latency in Distributed Shared-Memory Multiprocessors", © 1998 IEEE, p. 134-137.*
Martel et al., "Optimal Prioritized Conflict Resolution on a Multiple Access Channel", © 1991 IEEE, p. 1102-1108.*
Piepmeier, "Optimal Balancing of I/O Requests to Disks", © 1975 ACM, p. 524-527.*
Burkhard et al., "Rotational Position Optimization (RPO) Disk Scheduling", © 2001 UCSD, p. 1-11.*

* cited by examiner

Primary Examiner—Brian R. Peugh
(74) Attorney, Agent, or Firm—John L. Roguz

(57) ABSTRACT

Expected access times (EATs) of write request to a disk drive are essentially a measure of the predicted service time for the write request. Write Requests generated by a caching storage controller to a disk drive are essentially maintenance functions used to clear the cache. The disk drive modifies the EATs of write commands with a penalty such that read requests requiring disk access are preferentially satisfied. The penalty may be constant or may be established based on one or more factors, and may even be negative if necessary to clear a cache full of writes requiring destaging to disk.

21 Claims, 1 Drawing Sheet

READ PRIORITY CACHING SYSTEM AND METHOD

FIELD OF THE INVENTION

The present invention relates generally to data storage disk drives.

BACKGROUND OF THE INVENTION

Many current storage subsystems have a caching controller backed up by many separate disk drives. Write requests arriving at a storage subsystem are generally cached and completion status is returned immediately. Read requests are serviced first from the storage subsystem cache and only in the event of a cache miss does the request filter down to one or more of the disk drives being managed. Performance of the storage subsystem depends on the completion of read data requests and acceptance of write data requests in the shortest time possible. Modifying the queuing behavior of the disk drives contained in such a storage subsystem can improve its performance.

Most disk drive queue sorting algorithms attempt to maximize throughput by sorting all commands in their queue for the shortest seek times with the least latency using what is called a "Shortest Access Time First" (SATF) algorithm. As recognized by the present invention, however, write requests submitted to the disk drives are intrinsically different from read requests in that acceptance of write requests have already been satisfied using the storage subsystem cache and most write commands to the disk drives are actually maintenance requests generated internally by the storage subsystem to free up cache resource. Read requests, on the other hand, are time critical in that they are storage subsystem cache misses and system performance depends on satisfying these requests in the shortest time possible.

Nevertheless, while write requests are not as important to storage subsystem performance as read requests, good throughput for write requests is still desirable to maintain the storage subsystem's ability to accept new write requests. Having made the above critical observation, the solution herein is provided.

SUMMARY OF THE INVENTION

A disk drive for servicing read requests and write requests uses logic that includes determining, for at least some write requests, an expected access time (EAT), and adding a penalty period to at least some EATs of write requests to render modified EATs. The logic also includes satisfying read and write requests in a sequence based on their possibly modified EATs.

If desired, a single predetermined penalty period may be used for all write requests. Alternatively, a first penalty period may be used for a first write request and a second penalty period may be used for a second write request. The penalty period for a write request may be established based on: cache free space, type of write request, length of the write request, length of a current work queue, and/or performance of a disk drive. In any case, in the preferred embodiment the logic may determine EATs for read requests, with modified EATs of one or more write requests being less than an EAT of a read request such that the write request is satisfied before the read request.

In another aspect, a disk drive used in a data storage subsystem includes at least one storage disk, and at least one data cache. A disk drive satisfies read requests and write requests using its cache when possible and otherwise satisfies the requests using the disk. The disk drive includes means for determining expected access times (EATs) at least for requests requiring disk access, and means for modifying EATs of write requests.

In still another aspect, a computer program storage device contains instructions that are executable by a digital processor. The instructions include provision for delaying satisfaction of write requests based at least in part on a penalty.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
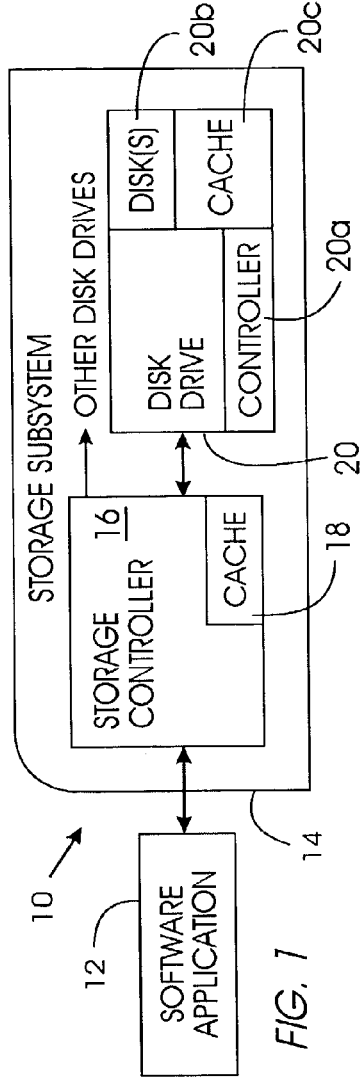
FIG. 1 is a schematic diagram of the present system.

Referring initially to FIG. 1, a system is shown, generally designated 10, for satisfying read requests and write requests generated by software applications 12 (only a single application 12 shown for clarity). The system 10 includes a storage subsystem 14 that in turn includes a storage controller 16 which accesses a solid state cache 18 and plural disk drives 20 to execute read requests and write requests. While for clarity only one cache 18 and one disk drive 20 are shown, the subsystem 14 generally will include plural disk drives if desired. Each disk drive 20 includes a disk drive controller 20a, plural data storage disks 20b, and a solid state cache 20c and satisfies read requests and write requests received from storage controller 16 in an order defined by the logic shown in FIG. 2 below.

As recognized herein, storage controllers 16 satisfy read requests from the cache 18 when possible, and otherwise access the disk drives 20. Likewise, the storage controller 16 will satisfy a write request by storing the write data in the cache 18, and sometime later will transfer the write data to one of its disk drives 20 as a maintenance operation. For this reason, satisfying read requests that require disk drive 20 access is generally a more important task impacting system performance from the perspective of the application 12 than is completing write requests, which from the application's perspective are complete when the data is initially written into the cache 18. Storage controller 16 attempts to maintain as many read requests and write requests as possible in its disk drives allowing each disk drive to optimize performance by scheduling the order of execution locally. Each disk drive 20 maintains a task set of read and write requests received from the storage controller 16 and schedules them for execution. Accordingly, the present invention recognizes that while fulfilling read requests is generally more important than completing write requests, write requests must nonetheless be completed during periods of high activity even if some read requests are delayed as a result.

Figure 2:
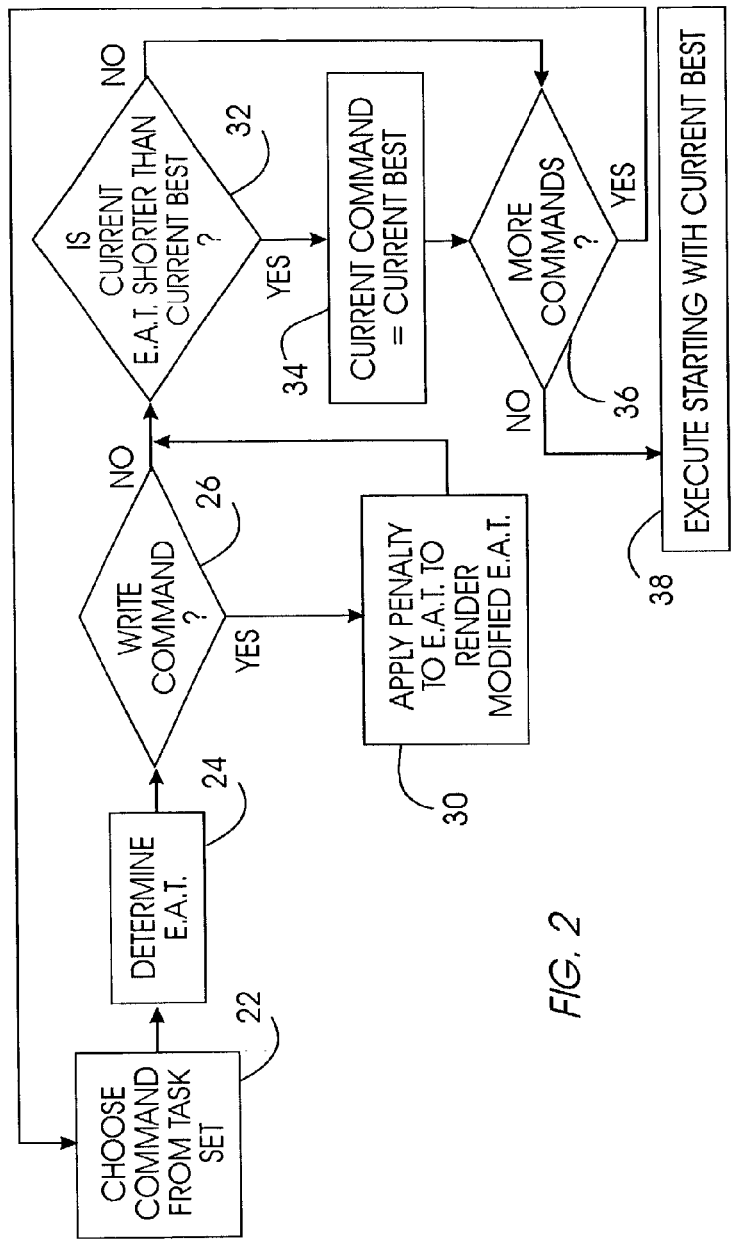
FIG. 2 is a flow chart of the logic that is executed by a disk drive controller every time a new command is selected for execution.

With the above recognition in mind, attention is directed to FIG. 2. Commencing at block 22, a command is selected from the current set of unfulfilled commands. At block 24, an expected access time (EAT) for the command is determined conventionally, using, e.g., seek time, latency, and probability of successfully fulfilling the command.

Proceeding to decision diamond 26, it is determined whether the command is a write command. If it is, the logic moves to block 30 to add a time penalty to the EAT of the write command under test to render a modified EAT. The penalty usually will be positive, i.e., the modified EAT will be longer than the original EAT, but in some cases (e.g., when activity is high and cache 18 free space is low), the penalty could be negative to ensure a write command is completed and cache space is freed thereby.

In one embodiment, the penalty may be a single predetermined penalty period that is used for all write requests. In other embodiments, the penalty may vary dynamically or otherwise such that a first penalty period may be used for a first write request and a second, different penalty period may be used for a second write request. For example, the penalty period for a write request can be relatively short or even negative if the write request has not been selected for a long time, particularly in the context of high activity. On the other hand, the penalty can be relatively longer if the rate that new commands arrive at the disk drive is lower. Yet again, the penalty can be established based on the type of write request. Also, the penalty may be dynamically established to be longer if the performance of the disk drive 20 as measured by, e.g., response time is relatively poor, with the penalty being shorter when the performance of the disk drive 20 is in an acceptable range or above an acceptable threshold.

From block 30, or from decision diamond 26 for a negative test, the logic moves to decision diamond 32, wherein it is determined whether the current EAT (as potentially modified at block 30) is shorter than the current "best" (i.e., shortest) EAT. If so, the command under test is designated as the "current best" at block 34. At decision diamond 36 it is determined whether any more commands exist in the task set for which EATs have yet to be calculated. If so, the logic loops back to block 22. Otherwise, when EATs have been calculated for all commands in the task set, the logic ends at block 38 by executing the current "best" command. The logic then repeats commencing at block 22 to select the next command among those still in the task set and any new commands which have arrived, given that the command selected at block 38 is the new starting point.

While the particular READ PRIORITY CACHING SYSTEM AND METHOD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

I claim:

1. A disk drive controller for servicing read requests and write requests, including logic for executing method acts comprising:
   determining, for at least some write requests, an expected access time (EAT);
   adding a penalty period to at least some EATs of at least some write requests but not to any read requests to render modified EATs; and
   satisfying read requests and write requests in a sequence based at least in part on their modified EATs.

2. The controller of claim 1, wherein at least a first penalty period is used for a first write request and a second penalty period is used for a second write request.

3. The controller of claim 2, wherein the penalty period for a write request is established based ax least in part on at least one of: cache free space, type of write request, transfer length of the write request, performance of the disk drive.

4. The controller of claim 1, wherein the controller accesses a cache and a disk.

5. The controller of claim 1, wherein the method acts executed by the logic comprise determining EATs for at least some read requests, wherein at least one modified EAT of at least a first write request is less than at least one EAT of at least a first read request, whereby the first write request is satisfied before the first read request.

6. A disk drive controller for servicing read requests and write requests. including logic for executing method acts comprising:
   determining, for at least some write requests, an expected access time (EAT;
   adding a penalty period to at least some EATs of at least some write requests to render modified EATs; and
   satisfying read requests and write requests in a sentience based at least in part on their modified EATs. wherein a single predetermined penalty period is used for all write requests.

7. A data storage system comprising:
   at least one storage disk;
   at least one data cache; and
   at least one disk drive controller satisfying read requests and write requests using the cache when possible and otherwise satisfying the requests using the disk, the controller including:
   means foT determining expected access times (EATs) at least for requests requiring disk drive access; and
   means for modifying EATs only of write requests.

8. The system of claim 7, wherein the means for modifying adds a penalty period to at least some EATs of write requests to render modified EATs, the write requests being satisfied based at least in part on their modified EAT.

9. The system of claim 8, wherein a single predetermined penalty period is used for all write requests.

10. The system of claim 8, wherein at least a first penalty period is used for a first write request and a second penalty period is used for a second write request.

11. The system of claim 10, wherein the penalty period for a write request is established based at least in part on the response time of the disk drive.

12. The system of claim 7, wherein the means for modifying determines EATs for at least some read requests, wherein at least one modified EAT of at least a first write request is less than at least one EAT of at least a first read request, whereby the first write request is satisfied before the first read request.

13. A data storane system comprising:
   at least one storafe disk;
   at least one data cache; and
   at least one disk drive controller satisfying read requests and write requests using the cache when possible and otherwise satisfying the requests using the disk, the controller including:
   means for determining expected access times (EATs) at least for requests requiring disk drive access; and
   means for modifying EATs of write requests, wherein the means for modifying adds a penalty neriod to at least some EATs of write requests to reader modified EATs, the write requests beiny satisfied based at least in part on their modified EATs, further wherein at least a first penalty period is used for a first write request and a second penalty period is used for a second write request, and wherein the penalty period for a write request is established based at least in part on existing cache free space.

14. A data storaic system comprising:
   at lest one storage disk;
   at least one data cache; and
   at least one disk drive controller satisfying read requests and write requests using the cache when possible and otherwise satisfying the requests using the disk, the controller including:
   means for determining expected access times (EATs) at least for requests requiring disk drive access; and
   means for modifying EATs of write requests, wherein the means for modifying adds a penalty period to at least some EATs of write requests to render modified EATs, the write requests being satisfied based at least in eart on their modified EATs, further wherein at least a first penalty period is used for a first write request and a second penalty period is used for a second write request, and wherein the penalty period for a write request is established based at least in part on a type of write request.

15. A data storage system comprising:
   at least one storage disk;
   at least one data cache; and
   at least one disk drive controller satisfying read requests and write requests using the cache when possible and otherwise satisfying the requests using the disk the controller including:
   means forsletermining expected access tints (EATs) at least for requests requiring disk drive access; and
   means for modifying EATs of write requests, wherein the means modifying adds a penalty period to at least some EATs of write requests to render modified EATs, the write requests being satisfied based at least in part on their modified EATs, further wherein at least a first penalty period is used for a first write request and a second penalty period is used for a second write request, and wherein the penalty period for a write request is established based at least in part on the transter length of the write request.

16. A computer program storage device containing instructions executable by a digital processor, the instructions embodying method acts comprising:
   altering expected access times only ot write requests relative to read requests based at least in part on a penalty.

17. The device of claim 16, wherein the act of altering embodied by the instructions includes:
   determining, for at least some write requests, an expected access time (EAT); and
   adding a penalty period to at least some EATs of write requests to render modified EATs.

18. The device of claim 17, wherein a single predetermined penalty period is used for all write requests.

19. The device of claim 17, wherein at least a first penalty period is used for a first write request and a second penalty period is used for a second write request.

20. The device of claim 19, wherein the penalty period for a write request is established based at least in part on at least one of: length of a current work queue, type of write request, performance of a disk drive.

21. The device of claim 17. wherein the method acts embodied by the instructions comprise determining EATs for at least some read requests, wherein at least one modified EAT of at least a first write request is less than at least one EAT of at least a first read request, whereby the first write request is satisfied before the first read request.

* * * * *